(No Model.)
C. G. JIRAN.
ELECTRIC SIGNAL FOR VELOCIPEDES.
No. 436,979. Patented Sept. 23, 1890.
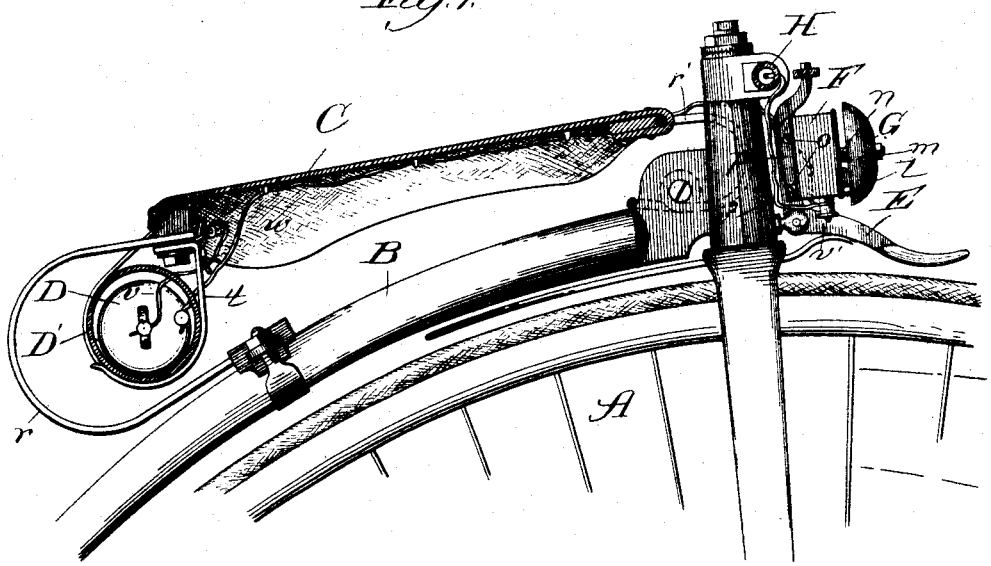
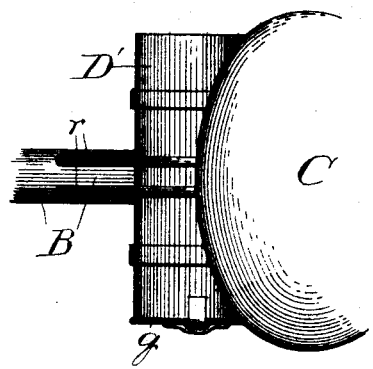
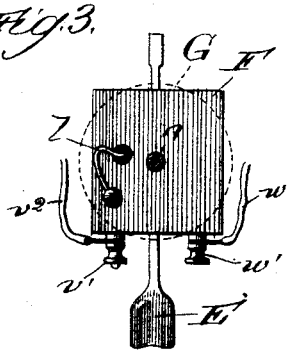
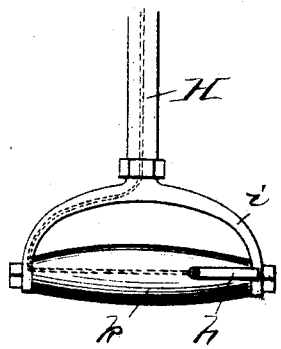
Witnesses:
Inventor:
Charles G. Jiran

UNITED STATES PATENT OFFICE.

CHARLES G. JIRAN, OF CHICAGO, ILLINOIS.

ELECTRIC SIGNAL FOR VELOCIPEDES.

SPECIFICATION forming part of Letters Patent No. 436,979, dated September 23, 1890.

Application filed June 30, 1890. Serial No. 357,252. (No model.)

*To all whom it may concern:*

Be it known that I, CHARLES G. JIRAN, a citizen of the United States, residing at Chicago, in the county of Cook and State of Illinois, have invented a new and useful Improvement in Electric Signals for Velocipedes, of which the following is a specification.

My invention relates to an improved alarm-bell attachment for velocipedes, and the object of my improvement is to provide such an attachment for any and all of the various forms of velocipedes whereby the bell may be rung by the rider to sound continuously by a mere pressure of the hand, and so to adapt it to existing parts of the velocipede that it shall be secure from injury in the ordinary use of the device, shall in no way interfere with the functions of nor encumber the latter, or subject the rider to inconvenience, and shall be in the most effective and convenient position for prompt operation.

To this end my invention consists in combining with certain features common to all velocipedes (principally the seat and combined steering appliance and brake) an electric battery, an electro-magnet, and armature, an insulated circuit-wire, a contact-spring, and a bell, as hereinafter fully set forth.

In the accompanying drawings, Figure 1 is a broken view of so much of a bicycle as will serve to permit the display upon it of my improved attachment, shown in side elevation, partly sectional; Fig. 2, a plan view, somewhat enlarged over the scale in Fig. 1, showing the battery-pocket, part way over which the rider's seat extends; Fig. 3, a view in front elevation of the electro-magnet case with the alarm-bell removed, but indicated in dotted lines; and Fig. 4, a broken plan view showing a handle end of the steering-bar provided with the circuit-closing spring.

A is the main wheel, B the metal "backbone," on which is supported the seat C, through the common medium for the purpose, of the leaf-springs $r$ and $r'$, respectively, at the opposite ends of the seat.

Below the rear expanded end of the seat C is an electric battery D, preferably of the dry species, and involving any known or suitable construction of that kind of battery. I inclose the battery in a cylindrical leather pocket D', supported, as shown, below and behind the seat and strapped or otherwise held in place, and access to the battery may be readily had on removing a cap $q$, covering one end of the pocket.

To the vertical portion of the bell-crank-shaped brake E, I secure the case F, containing the electro-magnet and armature, (not shown, because each may involve any construction commonly employed in connection with electric bells,) the securing being effected by providing parallel flanges $p$ on the rear side of the case to embrace between them the vertical portion of the bell-crank E, to which the flanges are secured by screws $o$, the bell-crank and flanges $p$ being properly insulated from each other. On the outer side of the case F projects the post $n$, on which the bell G is supported, being secured thereon by the nut $m$. The hammer $l$ extends (from the armature) through the front side of the case within the area of the bell, the stem of the hammer being suitably bent, as shown, to bring it inside the bell and cause it to act against the inner surface.

One pole of the battery D is connected by the insulated wire $w$ with a binding-post $w'$, forming one terminal of the electro-magnet in the case F, while the opposite pole of the battery is connected by the insulated wire $v$ with the metallic support $t$ for the incased battery, thence through the medium of the spring $r$ with the metallic backbone B, with which the metal transverse steering-bar H is in metallic connection. From the binding-post $v'$, forming the other terminal of the electro-magnet in the case F, proceeds an insulated wire $v^2$ into and through one side of the hollow transverse metal steering-bar H, terminating in the roller $k$ of wood or other insulating material in the bifurcated handle portion $i$ of the steering-bar and secured there to the fast end of a slender metal spring $h$, which projects at its free end over the metal portion of the bifurcated handle. Thus by pressing the spring into contact with the metal of the handle $i$, which may be accomplished without the least inconvenience to the rider by a slight pressure of the thumb, the bell G will be sounded and continue the alarm as long as the contact between the spring $h$ and handle $i$ is maintained. Such contact closes the battery-circuit, which then extends continuously from one pole of the battery along the wire $w$ to the terminal $w'$, through the electro-magnet to the terminal $v'$, and by way of the wire $v^2$ to the spring $h$, thence along the metal of the steering-bar H, backbone B, spring $r$, and support $t$ to the wire $v$, connected with the opposite pole of the battery. Obviously when the contact at the spring $h$ is broken, as it is by releasing the pressure upon the spring $h$, the circuit is opened and the ringing of the bell ceases.

What I claim as new, and desire to secure by Letters Patent, is—

1. In combination with a velocipede, a battery D, supported thereon, an electric bell G, having its case F, containing the electro-magnet and armature mechanism secured to the brake E and connected from one magnet-terminal directly with a pole of the battery, a contact $h$ on an insulated portion $k$ of the handle $i$ of the steering-bar H, and connected with the other electro-magnet terminal and controlling the circuit between it and the opposite pole of the battery, substantially as described.

2. In combination with a velocipede, an electric bell G, having its case F, containing the electro-magnet and armature mechanism, flanged and secured by the flange to the vertical portion of the brake E, a battery D, supported under the seat C, an insulated wire $w$, connecting one pole of the battery with a terminal of the electro-magnet, a conductor terminating in a handle of the steering-bar and comprising the insulated wire $v$, connecting the opposite pole of the battery with the metallic support for the latter, the said support, and other metallic portions of the velocipede, and an insulated wire leading from the opposite pole of the magnet into the said steering-bar handle, and terminating in a contact-spring $h$, overlapping the metal portion of the said handle, the whole being constructed and arranged to operate substantially as described.

CHARLES G. JIRAN.

In presence of—
  JOSEPH R. JIRAN,
  J. W. DYRENFORTH.